United States Patent
Mergenthaler

(10) Patent No.: US 8,668,409 B2
(45) Date of Patent: Mar. 11, 2014

(54) TWIST DRILL AND METHOD FOR THE PRODUCTION THEREOF

(71) Applicant: Kennametal Inc., Latrobe, PA (US)

(72) Inventor: Peter Karl Mergenthaler, Markt Bibart (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/682,187

(22) Filed: Nov. 20, 2012

(65) Prior Publication Data

US 2013/0183113 A1    Jul. 18, 2013

Related U.S. Application Data

(63) Continuation of application No. 12/421,737, filed on Apr. 10, 2009, now Pat. No. 8,317,438.

(30) Foreign Application Priority Data

Oct. 13, 2006 (DE) .......................... 10 2006 049 088
Sep. 27, 2007 (EP) ................... PCT/EP2007/008407

(51) Int. Cl.
*B23B 51/02*    (2006.01)

(52) U.S. Cl.
USPC .............................. 408/59; 408/230; 408/233

(58) Field of Classification Search
USPC ..................................... 408/57, 59, 230, 233
IPC ........................................................ B23B 51/02
See application file for complete search history.

(56) References Cited

U.S. PATENT DOCUMENTS

| | | | |
|---|---|---|---|
| 3,836,278 A | 9/1974 | McInnes | |
| 4,565,473 A | 1/1986 | Hosoi | |
| 5,312,207 A | 5/1994 | Pomp | |
| 5,599,145 A | 2/1997 | Reinauer et al. | 408/233 |
| 5,685,673 A | 11/1997 | Jarvis | |
| 5,704,740 A | 1/1998 | Ebenhoch et al. | 408/59 |
| 5,758,997 A | 6/1998 | Mealey et al. | 408/224 |

(Continued)

FOREIGN PATENT DOCUMENTS

| DE | 41 15 030 | 6/1992 |
|---|---|---|
| DE | 43 38 545 | 3/1994 |

(Continued)

OTHER PUBLICATIONS

International Search Report PCT/EP2007/008407 and English translation thereof.

*Primary Examiner* — Eric A Gates
(74) *Attorney, Agent, or Firm* — Larry R. Meenan, Esq.

(57) ABSTRACT

A twist drill includes a drill body having a chip flute extending a distance along the drill body. The chip flute has a leading edge and a run-out edge running along the chip flute. The run-out edge is disposed behind the leading edge in a direction of rotation of the twist drill. The chip flute, viewed cross-sectionally in a direction perpendicular to the longitudinal axis, includes a first wall portion and a second wall portion. The first wall portion extends along a curve between the run-out edge and the second wall portion. The second wall portion extends in a straight line from between the leading edge and the first wall portion. The first wall portion and the second wall portion are disposed adjoining one another and together define a J-shaped cross-sectional profile perpendicular to the longitudinal axis.

20 Claims, 5 Drawing Sheets

(56) References Cited

U.S. PATENT DOCUMENTS

| | | | |
|---|---|---|---|
| 5,800,100 A | 9/1998 | Krenzer | 408/224 |
| 5,947,653 A | 9/1999 | Hamberg | 408/59 |
| 5,993,119 A | 11/1999 | Moller | 408/57 |
| 6,012,881 A | 1/2000 | Scheer | 408/227 |
| 7,168,893 B2 | 1/2007 | Takiguchi | 408/233 |
| 7,192,224 B2 | 3/2007 | Fritsch et al. | 408/227 |
| 7,244,081 B2 | 7/2007 | Johnson et al. | 408/224 |
| 7,252,465 B2 | 8/2007 | Lindblom | 408/230 |
| 7,556,458 B2 | 7/2009 | Heilmann et al. | 408/59 |
| 2001/0031181 A1 | 10/2001 | Shallenberger et al. | 408/230 |
| 2003/0175086 A1 | 9/2003 | Muhlfriedel et al. | 408/230 |
| 2010/0092259 A1 | 4/2010 | Borschert et al. | 408/230 |

FOREIGN PATENT DOCUMENTS

| | | |
|---|---|---|
| DE | 195 22 836 | 1/1997 |
| EP | 0 750 960 | 1/1997 |
| GB | 1 338 586 | 11/1973 |
| JP | 58-84808 | 6/1983 |
| JP | 63062604 A | 3/1988 |
| JP | 2003-225816 | 8/2003 |
| JP | 2013136144 A * | 7/2013 |
| SU | 715 238 | 2/1980 |
| WO | WO 84/00910 | 3/1984 |

* cited by examiner

TWIST DRILL AND METHOD FOR THE PRODUCTION THEREOF

CONTINUING APPLICATION DATA

This application is a Continuation of U.S. patent application Ser. No. 12/421,737 which was pending as of the filing date of this application. U.S. patent application Ser. No. 12/421,737 now U.S. Pat. No. 8,317,438, is a Continuation-In-Part application of International Patent Application No. PCT/EP2007/008407, filed on Sep. 27, 2007, which claims priority from Federal Republic of Germany Patent Application No. 10 2006 049 088.6, filed on Oct. 13, 2006. International Patent Application No. PCT/EP2007/008407 was pending as of the filing date of U.S. patent application Ser. No. 12/421,737. The United States was an elected state in International Patent Application No. PCT/EP2007/008407.

BACKGROUND

1. Technical Field

The present application relates to a drill and a method for the production thereof.

2. Background Information

Background information is for informational purposes only and does not necessarily admit that subsequently mentioned information and publications are prior art.

The present application relates to a modular drilling tool, comprising a carrier body and a cutting unit that can be fastened thereto, the carrier body extending along a carrier body longitudinal axis, being realized substantially as a circular cylinder having a carrier body radius, and having a chip groove and a run-out or discharge edge that extends along the chip groove. The present application furthermore relates to a method for producing such a drilling tool.

Modular drilling tools are known in a variety of embodiments, which differ, for example, in their holding of separately realized cutting units. For example, soldered-in hard-metal cutting tips or complete drill bits are used as cutting units. There are known, moreover, changeable cutting units, such as reversible cutting plates, which are held on the carrier body of the drilling tool by means of screws, or such as cassettes, comprising reversible cutting plates, which are connected to the carrier body through positive holding. There are additionally known exchangeable drill bits, which are fastened to the carrier body, for example, by means of screws or through clamping or through positive fit. Common to these modular drilling tools is the division into the cutting unit and the carrier body. The carrier body has a front region, comprising chip grooves, and a shank region, for receiving the drilling tool into a clamping device of a machine tool.

Some tools, realized as drilling tools having reversible cutting plates, inner chip grooves and outer chip grooves which are shaped in such a way that they merge into one another in the middle to rear region of the tool. In the case of these tools, the chip groove has stiffening beads on both walls.

Fluctuations of the parameters in the drilling process result in the formation of differing chip shapes. In addition to the wanted fragmental chip pieces, unwanted helical chips and helical fragmental chips can also be produced. These chip portions, when being removed from the cutting edge of the drilling tool via the chip groove, continually or substantially continually cause contact with the wall of the bore, resulting in scores that impair the surface quality of the bore produced.

Moreover, a continual or substantially continual occurrence is that, at the run-out edge, chips become jammed between the wall of the bore and the rear of the drill, and thereby cause increased torsional loading of the drill body. In this situation, there is also an increased thermal loading of the drill, since the heat produced during cutting is also taken away from the base of the bore with the chips. In extreme cases, such a jammed-in chip thereby becomes welded to the wall of the bore.

OBJECT OR OBJECTS

At least one object of the present application is to describe or define a modular drilling tool, and a method for the production thereof, having a chip groove that is in one possible embodiment suitable in respect of the conveyance of chips.

SUMMARY

This object, in respect of the drilling tool, is achieved, according to at least one possible embodiment of the present application, by a modular drilling tool, comprising a carrier body and a cutting unit that can be fastened thereto. The carrier body extends along a carrier body longitudinal axis, and the body is realized substantially as a circular cylinder having a carrier body radius. The drilling tool further comprises a chip groove and a run-out or discharge edge that extends along the chip groove. The chip groove extends towards the run-out edge in a substantially convexly curved manner. A wall portion of the chip groove that is opposite the run-out edge runs out rectilinearly such that—viewed in a cross sectional view perpendicular virtually perpendicular to the carrier body longitudinal axis—the chip groove is delimited by a J-shaped chip groove wall and a concave fillet is formed, such that an acute advance angle is realized between a chip groove tangent to the run-out edge and a radial or radius that, at a tangent point, is tangential to the groove base in the region of the concave fillet. According to the latter, the drilling tool is realized in a modular manner, and has a substantially circular-cylindrical carrier body having a carrier body radius, and has a holder, realized on the carrier body, for the cutting unit. The carrier body comprises a run-out edge extending along a chip groove. The chip groove extends towards the run-out edge in a convexly curved manner such that—viewed in a cross-sectional view perpendicular or virtually perpendicular to the carrier body longitudinal axis—a concave fillet is formed, and an acute advance angle is realized between a chip groove tangent to the run-out edge and a radial that, at a tangent point, is tangential to the groove base in the region of the concave fillet. The delimiting wall of the chip groove in this case has a J-shaped contour, i.e. is composed approximately of a semicircular arc, adjoining one side of which there is a rectilinear wall portion. Overall, therefore, the chip groove has an asymmetric conformation, to the extent that the chip groove has a rectilinear wall portion on its one side and has a solely curved wall portion on its other side. The curved wall portion realizes the concave fillet and the acute advance angle. The rectilinearly extending wall portion is thus opposite the run-out edge in the direction of rotation, and extends out rectilinearly in the direction of the circumferential surface of the carrier body, said circumferential surface constituting a rear of the drill. This enables the chip groove to be produced by simply being milled into the carrier body, along this rectilinear run-out.

In respect of production technology, therefore, the J-shaped form is achieved in that the grooves are made by means of a milling cutter, for example a ball-ended milling cutter or a milling disc. The milling cutter is advanced is, not in the radial direction, but rather tangentially to the blank to be machined. Tangential advancing in this case is understood to mean that the center of the milling cutter is not applied in the radial direction to the carrier body longitudinal axis, but rather that the center of the milling cutter is placed on the blank such that it is parallel or virtually parallel to, but at a distance from, a radial.

Chip groove tangent in this case is understood to be the tangent to the chip groove wall at the run-out corner at which the chip groove wall meets the run-out edge, which tangent is oriented perpendicularly or virtually perpendicularly in relation to the carrier body longitudinal axis. The radial likewise extends perpendicularly or virtually perpendicularly in relation to the carrier body axis, and is tangential to the chip groove wall in its lowest point, which here is denoted as the tangent point.

The resultant sickle-shaped form of the chip cavity constituted by the chip groove results in an improved chip guidance, since, owing to the acute advance angle, there is realized a kind of wedge that, as it were, scrapes the chip from the wall of the bore. At the same time, owing to the convex curvature and the concave fillet constituted thereby, the chip is guided securely into the chip groove, and held there. The risk of a chip becoming jammed between the drilling tool and the wall of the bore is therefore reduced. The curvature of the chip groove is also instrumental in the shaping of the chip, such that the latter can be taken away easily and reliably in the chip groove. At the same time, owing to the J-shaped form, the chip is held reliably in the chip cavity.

According to an expedient development, the advance angle is in the range of between forty degrees and seventy degrees. A distinct and secure chip guidance within the chip groove is thereby achieved.

In at least one possible embodiment according to the present application, in the region of the concave fillet the chip groove is realized along a circular path having a radius of curvature. Such a circular path is produced, in one possible embodiment, by a milling cutter whose radius corresponds substantially to the radius of curvature of the concave fillet. For reasons of production technology, the radius of the concave fillet is somewhat greater than the radius of the milling cutter. The shape of the chip groove can thus be easily produced through the selection of a suitable tool, and the radius realized at this wall results in an improved shaping of the chips to be taken away.

In one possible development, the chip groove has a diameter of between 0.4 and 0.6 times the carrier body radius. In one possible embodiment of the present application, the remaining cross-section of the carrier body is, at the same time, suitable for absorbing the occurring forces and moments.

In at least one possible embodiment, the concave fillet has a fillet width of between 0.6 and 1 times the radius, and thus between 0.3 and 0.5 times the diameter, of the milling cutter used. In one possible embodiment, at the same time the concave fillet has a fillet depth in the range of 0.3 to 0.8 times the radius of curvature. The fillet width in this case is defined by the distance between the tangent point of the groove base and the projection of the run-out edge to the radial. The fillet depth in this case is the distance of the radial through the tangent point from the run-out edge. A concave fillet shaped thus guides the chips, over the entire course, in one possible embodiment well in the chip groove cross-section.

In at least one possible embodiment, the carrier body has a front region extending in the carrier body longitudinal direction, and has a run-out region adjoining this front region. The run-out region serves to eject the chip material. In the run-out region, the advance angle decreases in the carrier body longitudinal direction, in one possible embodiment continuously and progressively, towards the carrier body shank, resulting in a likewise continuously decreasing concave fillet. Owing to this decrease in the concave fillet, the chip material can run freely out of the groove. In this case, the advance angle decreases in the carrier body longitudinal direction, from the end of the front region, beyond the run-out region, to at least zero degrees.

Owing to the greatness of their length relative to their diameter, and to the cross-section being reduced by the chip groove, drilling tools are liable to deformations, including deflection, as a result of the forward-feed forces during the drilling operation. The vibrations resulting therefrom reduce the quality of the bore. In a possible embodiment, therefore, the run-out region has a length of between 1.0 and 2.0 times the radius of curvature. This length essentially ensures or promotes a free run-out of the chip material without excessive elongation of the carrier body.

In one possible embodiment, in a middle partial region of the run-out region the chip groove has opposing wall regions that extend parallelwise in the initial region and are connected by a semicircular path. This groove shape can be easily produced by the milling cutter used for the front region.

The object relating to the production method is additionally achieved, according to the present application, by a method for producing a modular drilling tool, which has a carrier body realized substantially as a circular cylinder extending along a carrier body longitudinal axis and having a carrier body radius. The modular drilling tool comprises a cutting unit that can be fastened to this carrier body, and also a chip groove and a run-out edge that extends along the chip groove. The chip groove is machined with the aid of a milling cutter such that—viewed in a cross-sectional view perpendicular or virtually to the carrier body longitudinal axis—the chip groove is realized to be J-shaped, such that it extends towards the run-out edge in a convexly curved manner and a concave fillet is formed. An acute advance angle is realized between a chip groove tangent to the run-out edge and a radial that, at a tangent point, is tangential to the groove base in the region of the concave fillet. The possible embodiments stated in respect of the drilling tool are also to be assigned analogously to the method.

For the purpose of producing the drilling tool, provision is made in this case whereby the chip groove is machined by means of a milling cutter in such a way that the chip groove, viewed in a cross-sectional view perpendicular or virtually perpendicular to the carrier body longitudinal axis, extends convexly towards the run-out edge, and a concave fillet is formed, in such a way that an acute advance angle is realized between a chip groove tangent to the run-out edge and a radial that, at a tangent point, is tangential to the groove base in the region of the concave fillet. Such a method is suitable for producing the chip groove in a continuous operation.

In one possible embodiment according to the present application, the chip groove is machined in a continuous operation, following the milling in the front region, in a run-out region adjoining the front region. In this case the milling cutter is in one possible embodiment swiveled in such a way that the advance angle is reduced, in one possible embodiment, to zero degrees. This measure results in the sickle-shaped form of the chip cavity, constituted by the concave fillet, undergoing transition to a straight run-out. That is to say, at least in the end region of the run-out region, the chip groove wall extends out rectilinearly, such that the chip can emerge easily from the chip groove. In this case, the milling cutter is swiveled appropriately in a simple manner. There is then essentially no need or desire for tool changing for alteration of the cross-sectional geometry, such that a rapid, inexpensive realization of the chip groove in one working step is rendered possible.

The realization of the run-out region is also possible, in principle, independently of the form of the chip groove with the concave fillet. A run-out region realized thus can also be used in the case of conventional tools. Owing to the form of the run-out region, trouble-free emergence of chips from the chip groove is also achieved in the case of these tools.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One possible embodiment of the present application is explained more fully in the following with reference to a drawing, wherein, in schematic representations, respectively.

DESCRIPTION OF EMBODIMENT OR EMBODIMENTS

Parts that correspond to one another are denoted by the same references in the figures.

Figure 1:
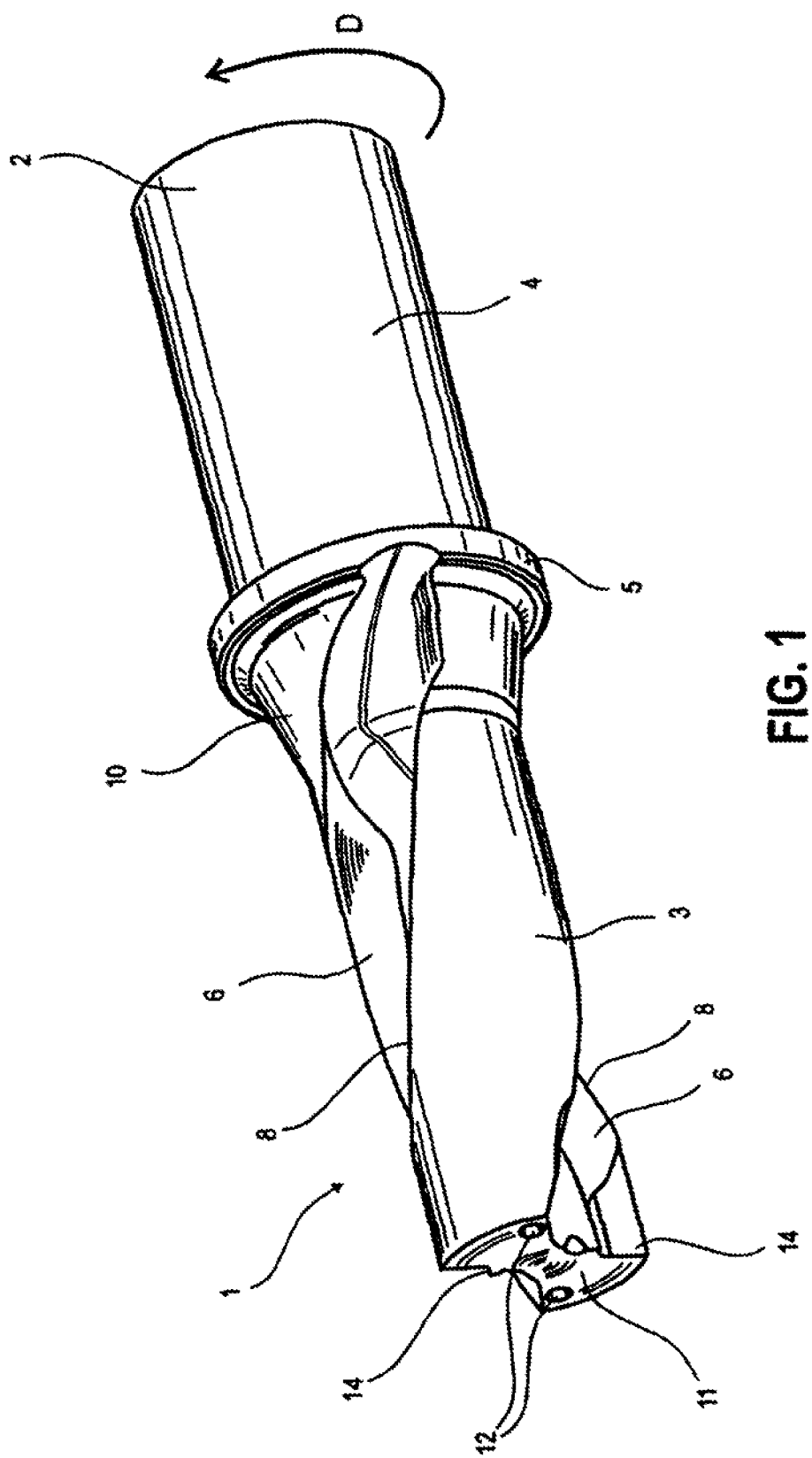
FIG. 1 shows a perspective representation of a carrier body of a modular drilling tool.

FIG. 1 shows a perspective view of a carrier body of a modular drilling tool 1, without a cutting unit. The carrier body 2 is divided into a front region 3 and a shank region 4. The two regions are separated by a shoulder 5, which constitutes a bearing-contact collar. In one possible embodiment, the front region 3 has two chip grooves 6, which extend helically, diametrically opposite one another, in the front region 3. Viewed in the direction of rotation D of the drill, the chip groove 6 is in each case adjoined at the end by a run-out edge 8, which likewise extends helically, corresponding to the chip groove 6. Provided towards the shank region 4 is a run-out region 10, in which the chip groove 6 runs out of the carrier body 2, along the shoulder 5. The carrier body 2 additionally has a coolant bore 12 that corresponds, respectively, to each of the chip grooves 6, the openings of which bores are arranged on the end face 11 of the carrier body 2. In one embodiment, two plate seats 14, for receiving reversible cutting plates 16 (cf. FIG. 2), not represented in FIG. 1, are realized in the front end region of the carrier body 2.

The reversible cutting plates 16 each constitute a cutting unit of the modular drilling tool 1. Exchangeable drill bits, in one possible embodiment, can also be provided as cutting units, as an alternative to reversible cutting plates 16. The modular structure offers the inexpensive possibility of using for the cutting unit highly specialized materials that withstand the large loads during chip-removing machining, and at the same time of using other appropriate, and less expensive, materials for the carrier body. Owing to the exchangeability of the cutting units, it is also the case that the cutting units often need to be exchanged or should be exchanged when cutting edges have become worn.

Figure 2:
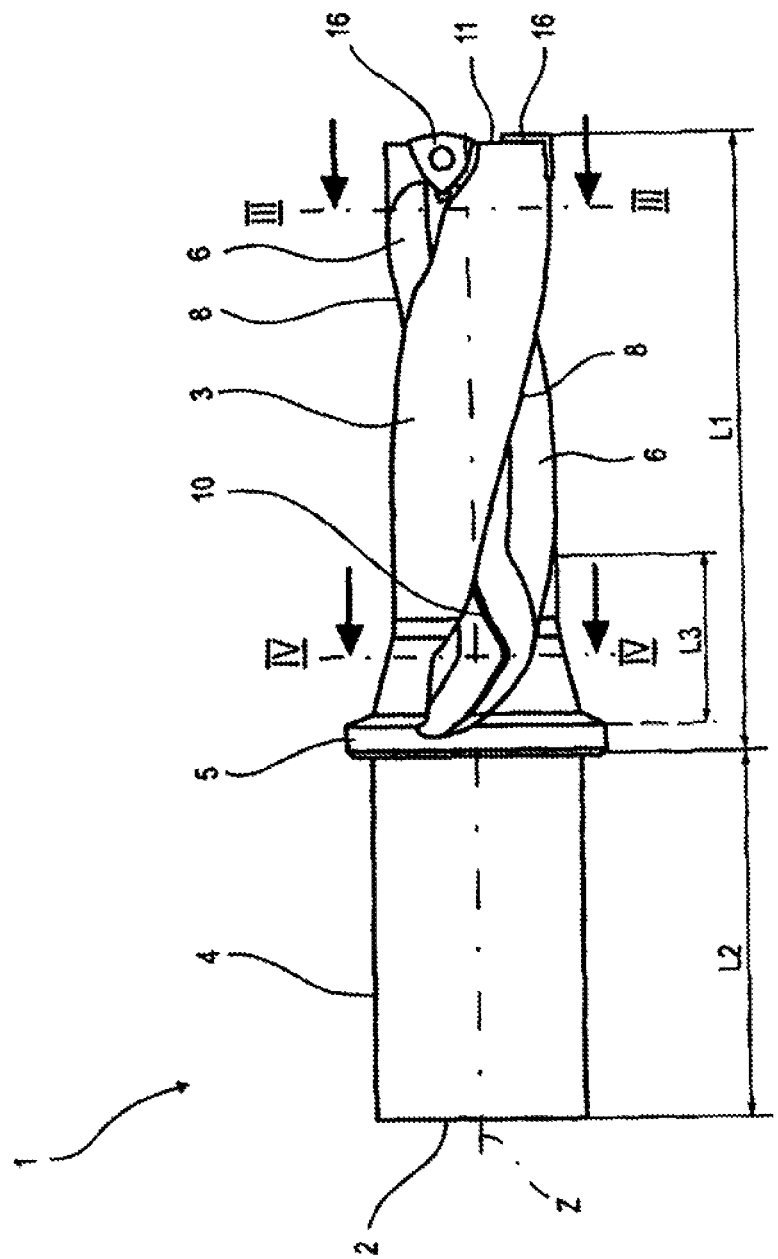
FIG. 2 shows a side view of the carrier body according to FIG. 1.

FIG. 2 shows a side view of the drilling tool 1. Represented on the carrier body 2 are two reversible cutting plates 16, which are fastened, radially offset in relation to one another, in the respective plate seat 14. The reversible cutting plates 16 project beyond the end face 11. The radially inner reversible cutting plate 16 extends beyond the carrier body longitudinal axis Z and at the same time overlaps the outer reversible cutting plate 16 in the radial direction, as a result of which both reversible cutting plates 16 have an overlapping working region. If necessary and/or desired, the radially inner and radially outer reversible cutting plates 16 differ in their realization.

The length of the drilling tool 1 as a whole is given by a clamping length L2 of the shank region 4 and an effective projection length L1. The run-out region 10 adjoining the front region 3 has the length L3. In this case, the active drilling length of the front region 3 corresponds to a bore depth for which the drilling tool is intended. This bore depth is usually specified in multiples of the carrier body diameter. The active length of the front region corresponds substantially to the difference between the effective projection length L1 and the length L3 of the run-out region 10.

Figure 3:
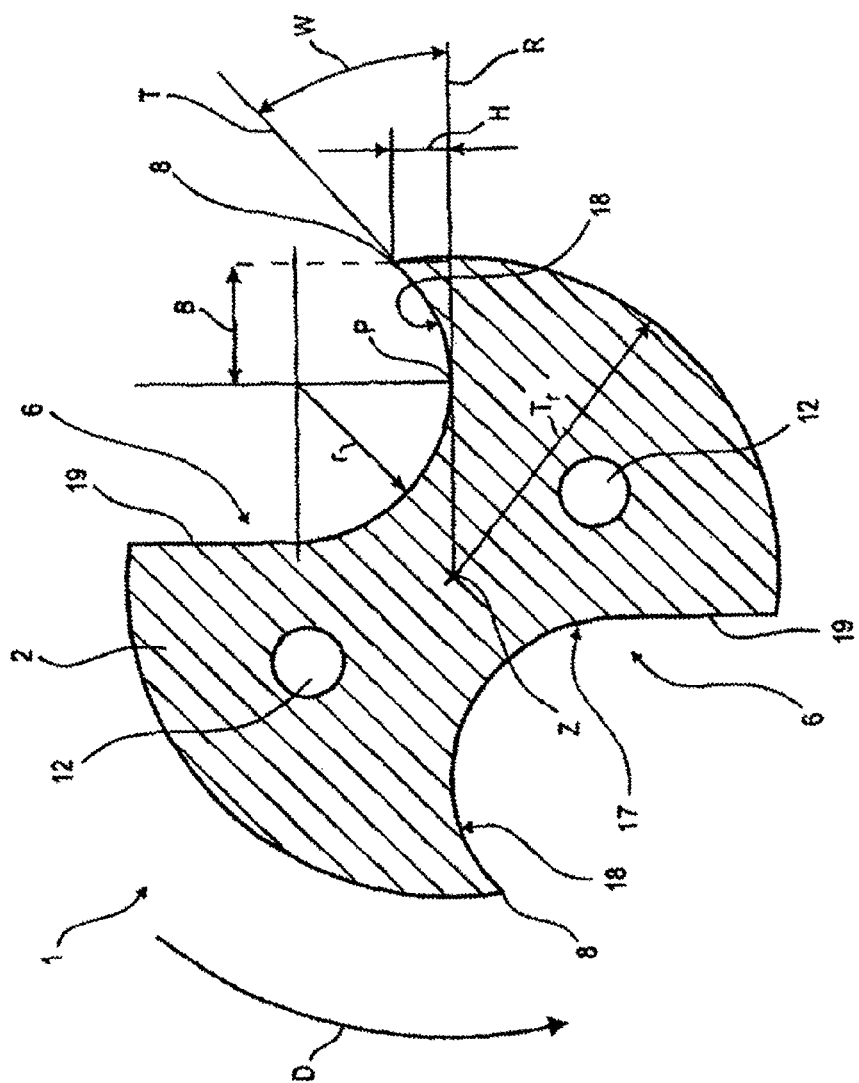
FIG. 3 shows a cross-section perpendicular or virtually perpendicular to the carrier body longitudinal axis, along the section line III-III in FIG. 2.

Whereas, over the length of the front region 3, the chip groove 6 has a chip groove geometry that remains substantially constant, this geometry varies continuously or substantially continuously in the course of the run-out region 10. Substantially constant geometry in this case is understood to mean that the basic geometry, explained in the following with reference to FIG. 3, is maintained apart from possible variations of the individual dimensions, for example because of a core tapering in the longitudinal direction of the drilling tool 1. The chip groove 6 in the front region 3 in this case is realized for good chip shaping and chip discharge, in one possible embodiment in such a way that the chip is held securely in the chip groove 6 and the chip is prevented, restricted, and/or minimized from becoming jammed between a wall of the bore and the rear of the drill. In the run-out region 10, by contrast, the chip groove 6 is realized such that the chip can emerge easily from the chip groove 6.

FIG. 3 shows a cross-sectional surface along the section line III-III according to FIG. 2. The two coolant bores 12 are arranged within the carrier body 2, which has a carrier body radius $T_r$. The chip groove 6 is delimited by an approximately J-shaped chip groove wall 17. The latter has a wall portion that has the shape of a circular arc and has a radius r. This wall portion in the shape of a circular arc runs out, on the one side, to the rear of the drill, and adjoins the run-out edge 8.

The chip groove 6 thereby constitutes a concave fillet 18 towards the run-out edge 8, and has a sickle-shaped course in the region of the concave fillet 18. The sickle tip is constituted by the run-out edge 8. An advance angle W is realized in this case between a chip groove tangent T and a radial or radius R. The chip groove tangent T is the tangent of the circular-arcshaped wall portion, in the run-out point of the wall portion, to the run-out edge 8. The radial R is constituted by a straight line that extends through the middle point (carrier body longitudinal axis Z) and that is tangential to the groove base in the region of the concave fillet. The point of contact of the radial R in the region of the groove base is termed the tangent point P. The concave fillet 18 has a fillet depth H and a fillet width B. The fillet depth H is defined as the distance of the radial R from the run-out edge 8, i.e. the fillet depth H—viewed in a cross-sectional view—corresponds to the shortest distance between the radial R and the run-out edge 8, thus to the corner point between the chip groove wall and the rear of the drill. The fillet width B in this case is defined by the distance between the radial R tangential to the groove base and a projection of the run-out edge to the radial R. The fillet width B is therefore the distance between the tangent point P and a vertical to the radial R extending through the corner point (run-out edge 8) between the chip groove wall and the rear of the drill.

The chip groove wall runs out acutely towards the run-out edge 8, such that an approximately wedge-shaped wall region is realized. The advance angle W in this case lies in a range of between approximately forty degrees and seventy degrees. This very acute form reliably reduces the risk of a chip becoming jammed between a bore wall and the rear of the drill. Rather, owing to the wedge-shaped or sickle-shaped form, the chip is scraped from the bore wall and caught in the sickle-shaped concave fillet 18. At the same time, a good chip shaping effect is achieved by the curvature of the chip groove wall adjoining the run-out edge 8. For this purpose, the concave fillet 18 has a radius of curvature that, in one possible embodiment, is in the range of between 0.4 and 0.6 times the carrier body radius $T_r$. In order to hold the chip securely and reliably in the chip groove 6, the concave fillet width B is approximately in the range of between 0.6 and 1.0 times the radius of curvature r. At the same time, the concave fillet depth H is approximately 0.3 to 0.8 times the radius of curvature r. Overall, reliable chip removal is achieved through this chip groove geometry.

The wall portion 19 of the chip groove 6 that is opposite the run-out edge 8 in the direction of rotation D is of little importance for the shaping and the removal of chips, and in one possible embodiment it is realized as a straight wall portion 19. Starting from the run-out edge 8 above the circular-arc-shaped wall portion in the region of the concave fillet 18, the straight wall portion 19 extends as far as the rear of the drill of the carrier body 2.

The chip groove geometry described here can be produced in a simple and inexpensive manner, in one possible embodiment in a single-stage machining process, with the aid of a milling cutter, in one possible embodiment a ball-ended milling cutter. There is often no need or desire for resource-intensive grinding processes or multiple application of a machining tool. Rather, the chip groove geometry is determined substantially by the geometry of a milling head 20 (cf. FIG. 5) of the ball-ended milling cutter. The radius of curvature r of the concave fillet 18 therefore also corresponds substantially to the radius of the ball-ended milling cutter.

Figure 4:
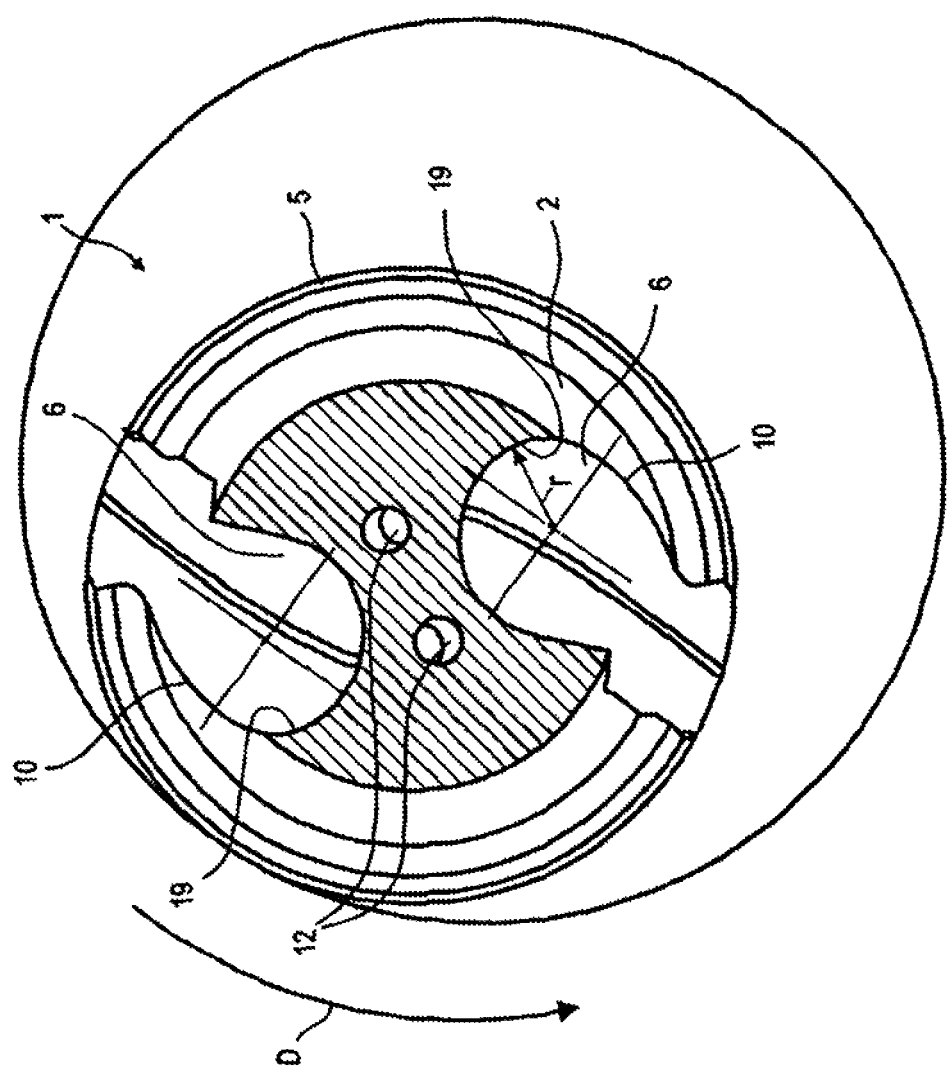
FIG. 4 shows a top view of a section perpendicular or virtually perpendicular to the carrier body longitudinal axis, along the section line IV-IV in FIG. 2.

The geometry of the chip groove 6 in the run-out region 10 can be seen from FIG. 4. Whereas the basic geometry, shown in FIG. 3, with the concave fillet 18 and the wall portion 19 running out rectilinearly opposite the run-out edge 8, is constant or substantially constant beyond the front region 3, the geometry varies over the run-out region 10, in one possible embodiment continuously or substantially continuously.

The chip groove 6 is widened in the run-out region 10 and shaped out into the shoulder 5. In the run-out region 10, the fillet depth H decreases progressively, until finally a rectilinear run-out is realized at the end of the run-out region 10. The advance angle W is therefore reduced to zero degrees, and in certain instances can also assume negative values. The chip is therefore no longer held captive in the chip groove 6, but can emerge from the latter without difficulty.

A concave fillet is now realized at the end of the run-out region 10, on the opposite wall portion 19, and the wall portion 19 extends along a curved line having the radius of curvature r.

This geometry in the run-out region 10 is easily produced through a defined swiveling of the milling cutter. The milling method for producing the chip groove 6 is explained with reference to FIG. 5, in which differing positions of the milling head 20 of a ball-ended milling cutter, which are denoted by K1-K7, can be seen. The milling head 20 has a radius that corresponds to the radius of curvature r. The carrier body longitudinal axis Z constitutes the z direction, and the plane of the drawing constitutes the x-y plane of the indicated coordinate system.

Figure 5:
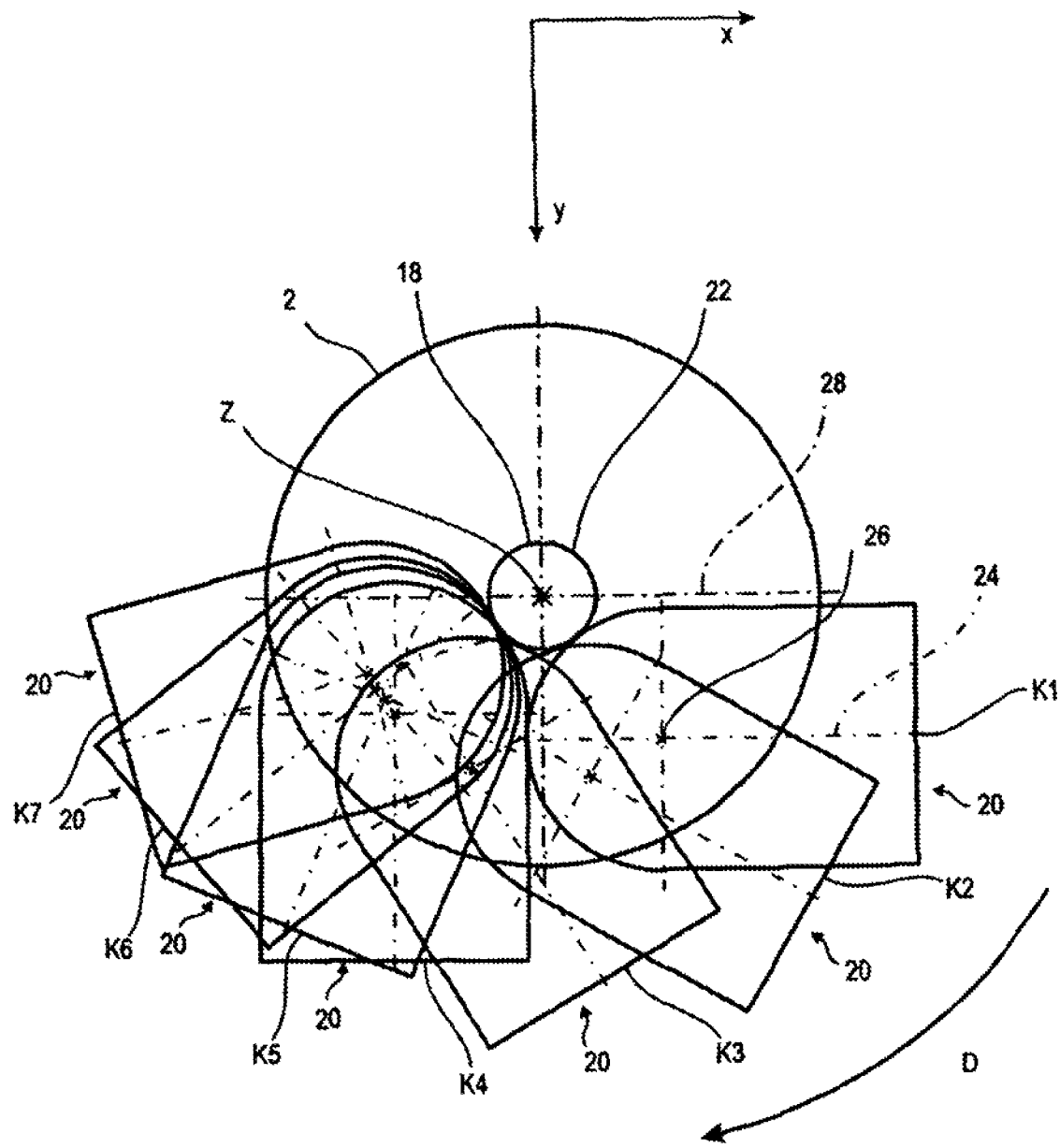
FIG. 5 for the purpose of explaining the method for milling the chip groove, shows a highly schematic front view of the carrier body with an indicated milling head in differing milling positions.

For the production of the carrier body 2, a suitable round material is turned to the required or desired outer dimension prior to the machining operation represented in FIG. 5. In this process, a shoulder 5 is produced between the portion of the carrier body 2 intended as a front region 3 and that intended as a shank region 4. A thus produced semi-finished product for a carrier body 2 is clamped-in by the shank region for the purpose of milling the chip grooves 6, such that the front region 3 to be produced can be machined. By means of the milling head 20, milling into the carrier body 2 is effected as described in the following, such that a chip groove 6, having the required or desired geometric characteristics, is produced for each machining operation.

For this purpose, starting from the end face of the carrier body 2, the milling head 20 is used to mill into the latter, the distance of the milling cutter longitudinal axis 24 from the carrier body longitudinal axis Z being less than the carrier body radius $T_r$, until the milling head 20 is tangential to a core circle 22 of the carrier body 2. In this position (K1), the milling head 20 is moved, in a forward-feed motion in the z direction, towards the shank region 4. At the same time, the carrier body 2 is rotated in the direction of rotation D, such that the helical chip groove 6 is realized with a constant or substantially constant pitch and constant or substantially constant advance angle W. The thus produced front region 3 of the chip groove 6 has a length that corresponds to the drilling depth intended for the drilling tool 1. During the machining of the front region 3, the milling head 20 assumes the relative position denoted by K1 in FIG. 5 in respect of the carrier body 2.

The special movements of the milling head 20 or of the carrier body 1 that are described here correspond to the possible and easily controlled sequence of movements. The movements can also be executed, however, through appropriate control of the respectively other part. What is crucial is the relative positioning and movement of the milling head 20 in relation to the carrier body 2.

For the purpose of producing the chip groove 6 in the run-out region 10 the milling head 20, with its longitudinal axis 24 in the xy plane, is rotated about Z in a previously calculated manner. The milling head 20 is therefore, as it were, rolled on the core circle 22. For this purpose, the milling head 20 is rotated about an axis of rotation 26 oriented parallelwise in relation to the z direction. At the same time, a forward feed is effected in the z direction and the carrier body 2 is rotated further in the direction of rotation D. The milling head 20 thereby moves through the positions K1 to K7. The depth of the chip groove 6 remains unchanged in this case.

Whereas, in the position K1, the milling cutter longitudinal axis 24 is oriented parallelwise in relation to a center plane 28 of the carrier body 2, in a middle region of the run-out region 10 it is oriented perpendicularly or virtually perpendicularly relative to the center plane 28 (approximately position K4), and at the end of the run-out region 10 it encloses an obtuse angle of approximately one hundred sixty degrees in relation to the center plane 28 (position K7). In one possible embodiment, the center plane 28 is defined by a plane that is oriented parallelwise in relation to the rectilinearly extending wall portion 19 at the end of the front region 3 and at the start of the run-out region 10.

From the position K7, the milling head 20 is moved, in the direction of its longitudinal axis 24, out of the carrier body 2. The machining operation is thereby concluded.

In at least one possible embodiment, the drilling tool is a twist drill having a longitudinal axis Z and a substantially circular cylindrical shape. The drill has a shank portion 4 that is configured to be inserted into and held by a machine tool, and has a drill body that is connected to the shank portion 4. The drill body also has a tip portion opposite the shank portion 4 with at least two cutting inserts or plates 16 removably fastened to the drill body at the tip portion. In at least one possible embodiment, at least two coolant channels 12 run through the shank portion 4 and the drill body to at least two coolant channel openings in the tip portion. The drill body also has at least two helical chip flutes 6 and at least two land surfaces corresponding to the chip flutes 6. Each of the chip flutes comprises a leading edge 8 and a trailing edge, each of which edge is disposed immediately adjacent and to extend along the length of its corresponding land surface. The leading edge 8 is disposed ahead of its corresponding land surface in the direction of rotation D of the twist drill, while the trailing edge is disposed behind its corresponding land surface in the direction of rotation D. Each chip flute also comprises a chip-guiding section 3 and a chip-discharge section 10. The chip-guiding section 3 is located between the at least two cutting inserts and the chip-discharge section 10. The chip-guiding section 3 comprises a first wall portion 18 and a second wall portion 19. The first wall portion 18 of the chip-guiding section 3 is disposed to extend along a curve from the leading edge 8 toward a central portion of the twist drill. The first wall portion 18 of the chip-guiding section 3 also is located between the leading edge 8 and the second wall portion 19 of the chip-guiding section The first wall portion 18 of the chip-guiding section 3 and its corresponding land surface meet at the leading edge 8, and define an acute angle therebetween at the leading edge 8. The first wall portion of the chip-guiding section 3 has a concave cross-sectional profile perpendicular to the longitudinal axis Z. This concave design promotes the retaining of chips produced in a cutting process in the chip flutes 6 to minimize contact of chips with a wall of a hole being cut by the twist drill, and to minimize torque forces and jamming of the twist drill in a hole being cut by the twist drill and to thus minimize damage to the surface texture of a wall of a hole being cut by the twist drill. The second wall portion 19 of the chip-guiding section 3 extends in a straight line from the trailing edge toward a central portion of the twist drill. The second wall portion 19 of the chip-guiding section 3 is located between the trailing edge and the first wall portion 18 of the chip-guiding section 3. The first wall portion 18 of the chip-guiding section 3 and the second wall portion 19 of the chip-guiding section 3 adjoin one another and together define a J-shaped cross-sectional profile perpendicular to the longitudinal axis Z. The chip-discharge section 10 also comprises a first wall portion 18 and a second wall portion 19. The first wall portion 18 of the chip-discharge section 10 extends in a straight line from the leading edge 8 toward a central portion of the twist drill. The first wall portion 18 of the chip-discharge section 10 is disposed between the leading edge 8 and the second wall portion 19 of the chip-discharge section 10. The first wall portion 18 of the chip-discharge section 10 has a straight cross-sectional profile perpendicular to the longitudinal axis Z, the design of which promotes evacuation of chips produced in a cutting process and received from the chip-guiding section 3. The second wall portion 19 of the chip-discharge section 10 extends along a curve from the trailing edge toward a central portion of the twist drill. The second wall portion 19 of the chip-discharge section 10 is located between the trailing edge and the first wall portion 18 of the chip-discharge section 10. The second wall portion 19 of the chip-discharge section 10 has a concave cross-sectional profile perpendicular to the longitudinal axis Z configured to promote evacuation of chips produced in a cutting process and received from the chip-guiding section 3. The first wall portion 18 of the chip-guiding section 3 has a curvature such that an acute angle is formed between a first line T and a second line. The first line T is tangential to the first wall portion 18 of the chip-guiding section 3 at the leading edge 8. The second line R extends radially from the longitudinal axis Z, and is also perpendicular to a third line extending along and from the straight second wall portion 19 of the chip-guiding section 3 and intersecting with the second line R, and finally is also tangential to the first wall portion 18 of the chip-guiding section 3 at, the tangent point P.

Modular drilling tool 1 having a carrier body 2 and a cutting unit 16 that is attachable thereto, the carrier body 2 extending along a carrier body longitudinal axis Z, being realized substantially as a circular cylinder having a carrier body radius and having a chip groove 6 and a run-out edge 8 that extends along the chip groove 6, the chip groove 6 extending towards the run-out edge 8 in a convexly curved manner such that—viewed in a cross-sectional view perpendicular or virtually perpendicular to the carrier body longitudinal axis Z—a J-shaped chip groove 6 having a concave fillet 18 is formed, and an acute advance angle W is realized between a chip groove tangent T to the run-out edge 8 and a radial R that, at a tangent point P, is tangential to the groove base in the region of the concave fillet 18, thereby resulting in improved chip guidance in the chip groove.

One feature or aspect of an embodiment is believed at the time of the filing of this patent application to possibly reside broadly in a modular drilling tool 1, comprising a carrier body 2 and a cutting unit 16 that can be fastened thereto, the carrier body 2 extending along a carrier body longitudinal axis 7, being realized substantially as a circular cylinder having a carrier body radius $T_r$, and having a chip groove 6 and a run-out edge 8 that extends along the chip groove, wherein the chip groove 6 extends towards the run-out edge 8 in a convexly curved manner and a wall portion 19 of the chip groove 6 that is opposite the run-out edge 8 runs out rectilinearly such that—viewed in a cross sectional view perpendicular or virtually perpendicular to the carrier body longitudinal axis Z—the chip groove 6 is delimited by a J-shaped chip groove wall 17 and a concave fillet 18 is formed, such that an acute advance angle W is realized between a chip groove tangent T to the run-out edge 8 and a radial R that, at a tangent point P, is tangential to the groove base in the region of the concave fillet.

Another feature or aspect of an embodiment is believed at the time of the filing of this patent application to possibly reside broadly in the modular drilling tool 1, wherein the advance angle W is between about forty degrees and about seventy degrees.

Yet another feature or aspect of an embodiment is believed at the time of the filing of this patent application to possibly reside broadly in the modular drilling tool 1, wherein the chip groove 6 in the region on the concave fillet 18 extends along a circular path having a radius of curvature r.

Still another feature or aspect of an embodiment is believed at the time of the filing of this patent application to possibly reside broadly in the modular drilling tool 1, wherein the radius of curvature r is approximately between 0.4 and 0.6 times the carrier body radius $T_r$.

A further feature or aspect of an embodiment is believed at the time of the filing of this patent application to possibly reside broadly in the modular drilling tool 1, wherein the concave fillet has a fillet width B that is approximately between 0.6 and 1.0 times the radius of curvature r and that is defined by the distance between the tangent point P and a projection of the run-out edge 8 to the radial R.

Another feature or aspect of an embodiment is believed at the time of the filing of this patent application to possibly reside broadly in the modular drilling tool 1, wherein the concave fillet has a fillet depth H approximately in the range of 0.3 to 0.8 times the radius of curvature r, the fillet depth H being defined by the distance between the run-out edge 8 and the radial R.

Yet another feature or aspect of an embodiment is believed at the time of the filing of this patent application to possibly reside broadly in the modular drilling tool 1, wherein the carrier body 2 has a front region 3 extending in the direction of the carrier body longitudinal axis Z and has a run-out region 10 adjoining the front region, the advance angle W decreasing continuously in the direction of the carrier body longitudinal axis Z in the run-out region 10.

Still another feature or aspect of an embodiment is believed at the time of the filing of this patent application to possibly reside broadly in the modular drilling tool 1 wherein the advance angle W decreases to at least zero degrees in the run-out region 10.

A further feature or aspect of an embodiment is believed at the time of the filing of this patent application to possibly reside broadly in the modular drilling tool 1, wherein the run-out region 10 has a length of between 1.0 and 2.0 times the radius of curvature r.

One feature or aspect of an embodiment is believed at the time of the filing of this patent application to possibly reside broadly in the modular drilling tool 1, wherein, in an end region of the run-out region 10, the region that is opposite the run-out edge 8 extends rectilinearly and the wall portion that extends towards the run-out edge extends in a convexly curved manner.

Another feature or aspect of an embodiment is believed at the time of the filing of this patent application to possibly reside broadly in the modular drilling tool 1, wherein in a middle partial region of the run-out region 10 the chip groove 6 has opposing wall portions, running outwards rectilinearly, which, in one possible embodiment, are parallel or virtually parallel in relation to one another and are intermediately connected via a circular path.

Yet another feature or aspect of an embodiment is believed at the time of the filing of this patent application to possibly reside broadly in a method for producing a modular drilling tool 1, which has a carrier body 2 realized substantially as a circular cylinder extending along a carrier body longitudinal axis Z and having a carrier body radius r, and which has a cutting unit 16 that can be fastened to this carrier body, and has a chip groove 6 and a run-out edge 8 that extends along the chip groove 6, the chip groove 6 being machined with the aid of a milling cutter such that—viewed in a cross-sectional view perpendicular or perpendicular to the carrier body longitudinal axis Z—the chip groove 6 is realized to be J-shaped, such that it extends towards the run-out edge 8 in a convexly curved manner and a concave fillet is formed, such that an acute advance angle W is realized between a chip groove tangent T to the run-out edge 8 and a radial R that, at a tangent point P, is tangential to the groove base in the region of the concave fillet.

Still another feature or aspect of an embodiment is believed at the time of the filing of this patent application to possibly reside broadly in the method, the milling cutter being swiveled-in in a run-out region 10 of the chip groove 6 in such a way that the advance angle W decreases in the direction of the carrier body longitudinal axis Z.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of drills, cutting tools, and components thereof, that may possibly be utilized or adapted for use in at least one possible embodiment may possibly be found in the following U.S. Pat. No. 7,390,148, entitled "Boring tool and a cutting insert therefor"; No. 7,364,390, entitled "Drilling tool" No. 7,360,974, entitled "Rotary cutting tool, such as a drill, comprising an exchangeable cutting insert, and an exchangeable cutting insert"; No. 7,322,777, entitled "Reamer with clamping arrangement for adjusting cutting insert and other cutting tools with clamping arrangements for adjusting cutting inserts"; No. 7,322,774, entitled "End mill and a method of operating an end mill"; No. 7,313,991, entitled "Cutting insert and use thereof"; No. 7,311,481, entitled "Milling cutter"; No. 7,201,543, entitled "Twist drill and method for producing a twist drill which method includes forming a flute of a twist drill"; No. 7,168,512, entitled "Cutting insert and milling cutter with such a cutting insert"; No. 7,090,447, entitled "Twist drill for drilling with a countersink cutting arrangement, and a cutting tool with a countersink cutting arrangement, and a cutting-chamfering tool"; No. 7,077,606, entitled "Rotating chip removing tool, such as a drilling and chamfering tool, with cutting inserts, and a milling cutter with cutting inserts"; No. 7,070,367, entitled "Twist drill for drilling having a replaceable drill tip, and a replaceable drill tip for use in a twist drill"; No. 7,048,480, entitled "Twist drill with a replaceable cutting insert and a rotary cutting tool with a replaceable cutting insert"; No. 6,988,859, entitled "Drill bit and method for grinding a drill bit"; No. 6,929,434, entitled "Rotary cutting tool"; No. 6,688,817, entitled "Drill for drilling, a method for making a drill for drilling, and a cutting tool"; No. 6,676,339, entitled "Indexable cutting insert for machining workpieces"; No. 6,655,882, entitled "Twist drill having a sintered cemented carbide body, and like tools, and use thereof"; No. 6,374,712, entitled "Disk milling cutter and suitable indexable insert" No. 6,309,149, entitled "Twist drill for dry drilling"; No. 6,293,738, entitled "Thread cutting bit"; No. 6,231,276, entitled "Cutting tool with an insertable adjustable stop, and an adjustable stop for a cutting tool"; No. 6,164,879, entitled "Drilling tool for drilling in solid metal"; No. 6,142,485, entitled "Chuck for rotary tools"; No. 6,116,825, entitled "Rotating cutting tool with a coolant passage and a method of providing it with coolant"; No. 5,967,710, entitled "Drilling tool for drilling in solid metal"; No. 5,873,683, entitled "Boring tool"; and No. 5,300,100, entitled "Drilling tool with reset inserts".

The following patents, patent applications or patent publications, are hereby incorporated by reference as if set forth in their entirety herein: DE 195 22 836 A1 having the following English translation the German title "DRILLING TOOL," published on Jan. 2, 1997.

All of the patents, patent applications or patent publications, which were cited in the International Search Report dated Mar. 11, 2008, and/or cited elsewhere are hereby incorporated by reference as if set forth in their entirety herein as follows: GB 1,338,586, having the title "ROCK DRILL", published on Nov. 28, 1973; "STUFENWERKZEUGE-NACHSHARGEN AUF EINER CNC-SCHLEIFMASCHINE," vol. 121, no. 12, published on Dec. 1, 1988, and having International Standard Serial Number 0043-2792; DE 43 38 545, having the following English translation of the German title "DRILL BIT, PARTIC. FOR WOOD MATERIAL—HAS CYLINDRICAL SHAPE WITH BASIC CUTTING EDGE AND HAS STRAIGHT SWARF GROOVE EXTENDING TO CENTRE OF BIT," published on Mar. 24, 1994; U.S. Pat. No. 3,836,278, having the title "tapered drill bit," published on Sep. 17, 1974; SU 715 238, having inventors Yarosiav V. KUNTSYAK, published on Feb. 15, 1980; U.S. Pat. No. 5,685,673, having the title "TWIST DRILL WITH REVERSE FLUTES," published on Nov. 11, 1997; WO 84/00910, having the title "MICRO DRILL," published on Mar. 15, 1884; EP 0750960, having the title following English translation of the German title "DRILLING TOOL, PARTICULARLY FOR METALLIC MATERIALS," published on Jan. 2, 1997; "METAL-CUTTING TOOLS TECHNOLOGICAL MODIFICATION OF THE TWIST DRILL CHIP GROOVE PROFILE," vol. 20, no. 12, published in 2002, having International Standard Serial Number 1068-798X; and DE 41 15 030, having the following English translation of the German title "CYLINDRICAL BIT," published Jun. 25, 1992.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 049 088.6, filed on Oct. 13, 2006, having inventor Peter Karl MERGENTHALER, and DE-OS 10 2006 049 088.6 and 10 2006 049 088.6, and International Application No. PCT/EP2007/008407, filed on Sep. 27, 2007, having WIPO Publication No. WO 2008/046496 and inventor Peter Karl MERGENTHALER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/008407 and German Patent Application 10 2006 049 088.6 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT EP2007/008407 and DE 10 2006 049 088.6 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to a of the provided details thereof, since modifications and variations thereof may be made without departing from the spirit and scope of the embodiments of the invention.

What is claimed is:

1. A twist drill comprising:
a drill body of generally cylindrical shape disposed about a longitudinal axis, the drill body having a first end configured to be coupled to a machine tool and an opposite second end, the drill body including a chip flute formed therein, the chip flute extending a distance along the drill body, the chip flute having a leading edge and a run-out edge running along the chip flute, the run-out edge disposed behind the leading edge in a direction of rotation of the twist drill, wherein:
the chip flute, viewed cross-sectionally in a direction perpendicular to the longitudinal axis, includes a first wall portion and a second wall portion,
the first wall portion extends along a curve between the run-out edge and the second wall portion,
the second wall portion extends in a straight line from between the leading edge and the first wall portion,
the first wall portion and the second wall portion are disposed adjoining one another and together define a J-shaped cross-sectional profile perpendicular to the longitudinal axis, and
the first wall portion has a curvature such that an acute advance angle is formed between a first line and a second line, the first line being tangential to the first wall portion at the run-out edge and the second line extending:
radially from the longitudinal axis and perpendicularly to a third line extending along and from the second wall portion and intersecting with the second line, and
tangentially to the first wall portion.

2. The twist drill of claim 1 wherein the acute advance angle is between 40 degrees and 70 degrees.

3. The twist drill of claim 1 wherein the first wall extends along a circular path having a constant radius of curvature.

4. The twist drill of claim 1 wherein the radius of curvature is in the range of from about 0.4 to about 0.6 times the radius of the drill body.

5. The twist drill of claim 1 wherein a distance between a fourth line and fifth line, which fourth line extends perpendicular to the second line at the point where the second line is tangential to the first wall portion, and which fifth line extends perpendicular to the second line and through the run-out edge, is in the range of from about 0.6 and about 1.0 times the radius of curvature.

6. The twist drill of claim 1 wherein the first wall portion has a depth which is defined by a distance between the second line and a sixth line extending from the run-out edge parallel to the second line, which distance is approximately in the range of 0.3 to 0.8 times the radius of curvature.

7. The twist drill of claim 1 wherein the acute advance angle decreases moving from the second end toward the first end of the drill body.

8. The twist drill of claim 7 wherein the acute advance angle decreases to at least 0 degrees in a run-out region.

9. The twist drill of claim 8 wherein the first wall extends along a circular path having a constant radius of curvature and wherein the run-out region has a length, along the longitudinal axis of the drill body, in the range of from about 1.0 to about 2.0 times the radius of curvature.

10. The twist drill of claim 1 wherein the opposite second end of the drill body includes a plate seat configured to receive a cutting plate therein.

11. The twist drill of claim 10 further comprising a cutting plate at least partially disposed in the plate seat and removably fastened to the drill body.

12. A method for producing a twist drill body of generally cylindrical shape disposed about a longitudinal axis, the method comprising:
forming the drill body having a first end configured to be coupled to a machine tool and an opposite second end;
forming a chip flute in the drill body extending a distance along the drill body; the chip flute having a leading edge and a run-out edge running along the chip flute; the run-out edge disposed behind the leading edge in a direction of rotation of the twist drill; the chip flute, viewed cross-sectionally in a direction perpendicular to the longitudinal axis, having a first wall portion and a second wall portion; the first wall portion extending along a curve between the run-out edge and the second wall portion; the second wall portion extending in a straight line from between the leading edge and the first wall portion; the first wall portion and the second wall portion adjoining one another and together defining a J-shaped cross-sectional profile perpendicular to the longitudinal axis; and the first wall portion having a curvature such that an acute advance angle is formed between a first line and a second line, the first line being tangential to the first wall portion at the run-out edge and the second line extending: radially from the longitudinal axis and perpendicularly to a third line extending along and from the second wall portion and intersecting with the second line, and tangentially to the first wall portion; and
milling the chip flute using a milling cutter by swiveling the milling cutter head in a run-out region of the chip flute such that the advance angle decreases moving in a direction from the second end of the drill body toward the first end of the drill body.

13. A twist drill comprising:
a drill body of generally cylindrical shape disposed about a longitudinal axis, the drill body having a first end configured to be coupled to a machine tool and an opposite second end, the drill body including a chip flute formed therein, the chip flute extending a distance along the drill body, the chip flute having a leading edge and a run-out edge running along the chip flute, the run-out edge disposed behind the leading edge in a direction of rotation of the twist drill, wherein:
the chip flute, viewed cross-sectionally in a direction perpendicular to the longitudinal axis, includes a first wall portion and a second wall portion,
the first wall portion extends along a curve between the run-out edge and the second wall portion,
the second wall portion extends in a straight line from between the leading edge and the first wall portion,
the first wall portion and the second wall portion are disposed adjoining one another and together define a J-shaped cross-sectional profile perpendicular to the longitudinal axis, and
the first wall portion has a curvature such that an acute advance angle is formed between a first line and a second line, the first line being tangential to the first wall portion at the run-out edge and the second line extending: radially from the longitudinal axis and perpendicularly to a third line extending along and from the second wall portion and intersecting with the second line, and tangentially to the first wall portion,
wherein the acute advance angle is between 40 degrees and 70 degrees.

14. The twist drill of claim 13 wherein the first wall extends along a circular path having a constant radius of curvature.

15. The twist drill of claim 13 wherein the radius of curvature is in the range of from about 0.4 to about 0.6 times the radius of the drill body.

16. The twist drill of claim 13 wherein a distance between a fourth line and fifth line, which fourth line extends perpendicular to the second line at the point where the second line is tangential to the first wall portion, and which fifth line extends perpendicular to the second line and through the run-out edge, is in the range of from about 0.6 and about 1.0 times the radius of curvature.

17. The twist drill of claim 13 wherein the first wall portion has a depth which is defined by a distance between the second line and a sixth line extending from the run-out edge parallel to the second line, which distance is approximately in the range of 0.3 to 0.8 times the radius of curvature.

18. The twist drill of claim 13 wherein the acute advance angle decreases moving from the second end toward the first end of the drill body.

19. The twist drill of claim 18 wherein the acute advance angle decreases to at least 0 degrees in a run-out region.

20. The twist drill of claim 19 wherein the first wall extends along a circular path having a constant radius of curvature and wherein the run-out region has a length, along the longitudinal axis of the drill body, in the range of from about 1.0 to about 2.0 times the radius of curvature.

* * * * *